(12) United States Patent
Pajak et al.

(10) Patent No.: US 6,307,344 B1
(45) Date of Patent: Oct. 23, 2001

(54) RFI SUPPRESSION PACKAGE FOR DC ELECTRIC MOTORS

(75) Inventors: John Pajak, Battle Creek; Christopher A. Hause, Eaton Rapids; Lawrence J. Noren, Springport, all of MI (US)

(73) Assignee: Fasco DC Motors, Inc., Eaton Rapids, MI (US)

( * ) Notice: Subject to any disclaimer, the term of this patent is extended or adjusted under 35 U.S.C. 154(b) by 0 days.

(21) Appl. No.: 09/517,824

(22) Filed: Mar. 2, 2000

Related U.S. Application Data

(60) Provisional application No. 60/122,453, filed on Mar. 2, 1999.

(51) Int. Cl.[7] .................................................. G05B 11/01
(52) U.S. Cl. ............................................ 318/629; 318/558
(58) Field of Search ..................................... 318/434, 558, 318/629; 361/111

(56) References Cited

U.S. PATENT DOCUMENTS

| | | | |
|---|---|---|---|
| 5,838,877 | * | 11/1998 | Elliot et al. ........................... 318/434 |
| 5,854,546 | * | 12/1998 | Hargis .................................. 318/629 |

OTHER PUBLICATIONS

Robert Myers, The Radio Amateur's Handbook, By the Headquarters Staff of thhe American Radios Relay League, 1974.*

* cited by examiner

*Primary Examiner*—Marlon T. Fletcher
(74) *Attorney, Agent, or Firm*—Andrus, Sceales, Starke & Sawall, LLP

(57) ABSTRACT

A radio frequency interference suppression circuit assembly for an electric motor is provided in an easily assembled efficient package. The circuit assembly uses a case which houses a toroid inductor and feed-through capacitors which are electrically connected to the case and the toroid inductor to form a filter. Connector leads are provided to connect the package to a power input of an electric motor.

6 Claims, 1 Drawing Sheet

RFI SUPPRESSION PACKAGE FOR DC ELECTRIC MOTORS

CROSS REFERENCE TO RELATED APPLICATION

Priority is claimed to U.S. Provisional Patent Application Ser. No. 60/122,453 which was filed on Mar. 2, 1999.

BACKGROUND OF THE INVENTION

The present invention relates to electric motors and more particularly to power circuits in electric motors and still more particularly to an electric motor having an assembly for suppressing radio frequency interference and conducted voltage transients.

Electric motors include a stator and a rotor which rotates about a central axis in response to opposing magnetic fields between the stator and the rotor. The opposing magnetic fields are typically induced by electric currents which flow in wire windings in the stator and rotor. Electric motors thereby convert electrical energy to mechanical energy in a rotating shaft which is attached to the rotor.

The electrical energy is supplied to a motor by electrical conductors which are connected to an external supply of electricity such as a battery or alternating current power lines. It is advantageous to provide a stable electrical power source to certain electric motors. For example, direct current motors require a stable direct current input having substantially no alternating current component. Electrical power circuits typically provide electricity including noise such as voltage surges and transient components. Electrical noise may be caused by any number of phenomena including, for example, power drains and surges form other machines which may be connected to the same power lines, and radio frequency disturbances which may be induced by alternating electromagnetic fields caused by near by electrical equipment.

Electrical power that is transmitted even a short distance through conductors acquires induced noise that was radiated through space. It is therefore impossible to provide a perfectly clean power signal over any substantial distance. Devices such as some electric motors which require clean power employ filter circuits proximate to their power input connections to remove most unwanted interference components in the electrical power signal.

Radio frequency interference (RFI) and conducted voltage transients are typically filtered from power signals by filters comprising inductors and capacitors. It has been common practice in the motor industry to use common axial inductors in conjunction with common capacitors in the motor input circuit connected together as filter circuits which are well known in the electrical arts.

The electrical parameters or values of inductors and capacitors are related to their physical size. The effectiveness of a filter is related to the circuit parameters and therefore related to the physical size of the inductors and capacitors.

Typically, RFI suppression components are mounted on the outside of the motor or alternatively a motor package size is increased to accommodate the additional components. The amount of RFI suppression achieved by known designs is often limited by size constraints which are imposed upon the inductor and capacitor components.

Typical RFI suppression circuits are constructed by assembling the inductor and capacitor components to a motor assembly and electrically connecting them together to form the proper filter circuit. There is a need in the art for an RFI suppression package which reduces the size and complexity of the RFI suppression components and incorporates them into a package to speed production and maximize RFI suppression.

BRIEF DESCRIPTION OF THE DRAWING

For a better understanding of the present invention, together with other objects, features and advantages, reference should be made to the following description of the preferred embodiment which should be read in conjunction with the following figure wherein like numerals represent like parts.

DETAILED DESCRIPTION OF THE INVENTION

Figure 1:
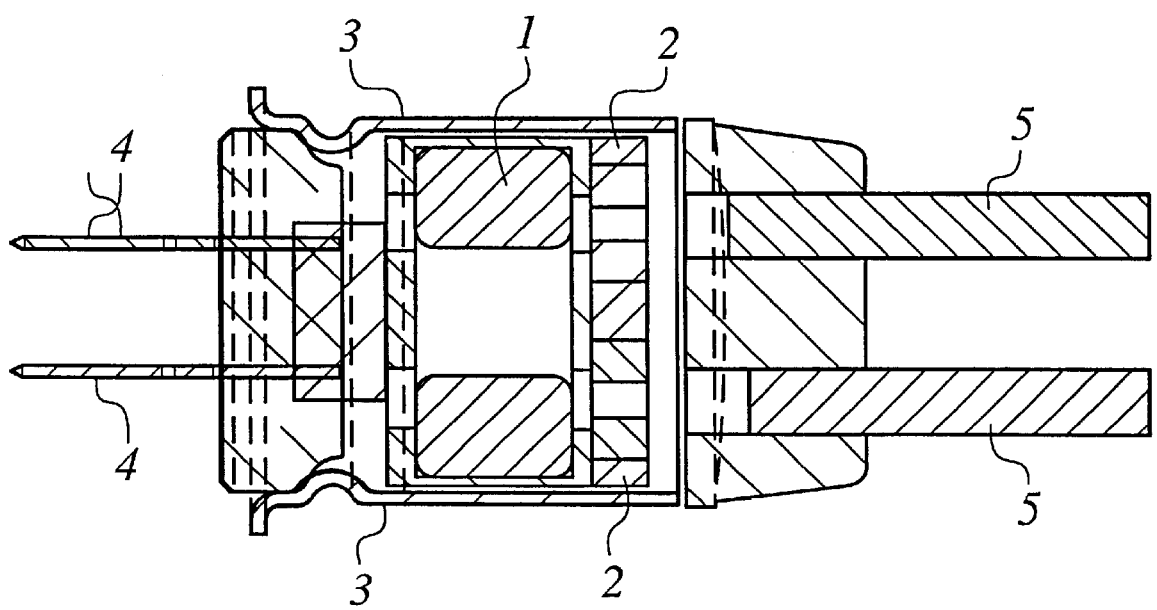
FIG. 1 is a sectional view of an exemplary RFI suppression package according to the invention.

According to the present invention, an assembly is provided which includes a common mode toroid inductor with feed-through capacitors and avoids the disadvantages which are associated with prior art methods of installing a number of discrete electronic components into the end cap of a D.C. motor. An exemplary embodiment of the invention is depicted in sectional view in FIG. 1.

A common mode toroid inductor 1 provides the advantageous electrical properties of a large axial inductor while facilitating the use of a much smaller assembly. It can be seen that the toroid inductor 1 of FIG. 1 is mounted transverse to a central axis of the container 3 thereby occupying minimal space.

Typical discrete capacitors are formed by a pair of internal conductors which are separated in space by a dielectric material. The conductors inside a typical capacitor are connected to an external electrical circuit by a pair of conductive leads. Feed-through capacitors take advantage of the spacial proximity of electrical components in an assembly. Feed-through capacitors are formed where a conductor passes through a hole in a conductive bulkhead which is electrically isolated from the conductor. The conductive bulkhead and the conductor which passes through it perform the electrical function of the pair of internal conductors in a typical conventional capacitor. The space between the conductor and the bulkhead is filled with a proper dielectric material to form a feed-through capacitor. Where the bulkhead and the conductor which passes through it require capacitance between them to form part of a circuit, a feed-through capacitor eliminates the need for a discrete component and the leads and connections that the discrete component requires in order to be connected as part of the circuit.

The present invention has at least one connection lead 4,5 for the motor power connections. The present invention also comprises an electrically conductive container 3 through which the connection leads 4,5 pass. A feed through capacitor 2 is used and can be seen in FIG. 1 where at least one connection lead 4 passes through the case 3.

Advantageously, the use of feed-through capacitors allows the motor case to be used as a ground plane and drain source for intermittent and continuous RFI emissions. Current assembly methods typically use multiple capacitors and discrete components to provide a suppression circuit. The cost of these components is exorbitant, and, by combining the required components into a single device, cost is drastically reduced and assembly steps during manufacture motors that require the device are eliminated. The combination of using a toroid inductor, feed-through capacitors and a conductive container which are electrically connected as an RFI filter circuit provides an easily assembled and efficient means for filtering RFI interference and conductive transients form electric motor power circuits.

Thus, according to the present invention there is provided an RFI suppression package with feed-through capacitors combined with a conductive container and a common mode toroid inductor in a single assembly. The assembly provides a maximum level of RFI suppression and allows for ease of assembly into existing motor designs.

The embodiments which have been described herein are but some of the several which utilize this invention and are set forth here by way of illustration but not of limitation. It is obvious that many other embodiments which will be readily apparent to those skilled in the art, may be made without departing materially from the spirit and scope of this invention.

What is claimed is:

1. A self-contained radio frequency interference suppression package for a direct current motor having a motor case, the package comprising:

a container;

a common-mode toroid inductor mounted within the container;

at least one feed-through capacitor mounted within the container and connected to said common mode toroid inductor to form a radio frequency interference suppression circuit; and at least one electrical lead extending from the container for connecting said radio frequency interference suppression circuit to an input of the direct current motor.

2. The radio frequency interference suppression package of claim 1 wherein the container is electrically conductive.

3. The radio frequency interference suppression package of claim 2 wherein the container is attached to the motor case such that the container is grounded.

4. The radio frequency interference suppression package of claim 3 wherein the common-mode toroid inductor and the feed-through capacitor are completely enclosed within the container.

5. A self-contained radio frequency interference suppression package for a direct current motor having a motor case, the suppression package comprising:

an electrically conductive container attachable to the motor case;

a common-mode toroid inductor enclosed within the container;

at least one feed-through capacitor enclosed within the container and connected to the common-mode toroid inductor to form a radio frequency interference suppression circuit; and at least one electrical lead extending from the container for connecting the radio frequency interference suppression circuit to an input of the direct current motor.

6. The radio frequency interference suppression package of claim 5 wherein the common-mode toroid inductor is mounted within the container transverse to a central axis of the container.

* * * * *